US005944824A

United States Patent [19]

He

[11] Patent Number: 5,944,824
[45] Date of Patent: Aug. 31, 1999

[54] SYSTEM AND METHOD FOR SINGLE SIGN-ON TO A PLURALITY OF NETWORK ELEMENTS

[75] Inventor: Jingsha He, San Jose, Calif.

[73] Assignee: MCI Communications Corporation, Washington, D.C.

[21] Appl. No.: 08/848,327

[22] Filed: Apr. 30, 1997

[51] Int. Cl.[6] .................................................. G06F 13/00
[52] U.S. Cl. ............................................................ 713/201
[58] Field of Search ....................... 395/188.01, 187.01, 395/186, 200.59, 726; 364/222.5, 286.4, 286.5; 380/4, 23, 30; 711/163, 164; 713/200, 201, 202

[56] References Cited

U.S. PATENT DOCUMENTS

| | | | |
|---|---|---|---|
| 5,305,456 | 4/1994 | Boitana | 395/700 |
| 5,586,260 | 12/1996 | Hu | 395/200.2 |
| 5,606,668 | 2/1997 | Shwed | 395/200.11 |
| 5,684,950 | 11/1997 | Dare et al. | 395/187.01 |
| 5,721,780 | 2/1998 | Ensor et al. | 380/25 |
| 5,768,503 | 6/1998 | Olkin | 395/187.01 |
| 5,768,504 | 6/1998 | Kells et al. | 395/187.01 |
| 5,815,665 | 9/1998 | Teper et al. | 395/200.59 |
| 5,862,323 | 1/1999 | Blakley, III et al. | 395/188.01 |

OTHER PUBLICATIONS

Bryant, "Designing an Authentication System: a Dialog in Four Scenes", pp. 1–18, http://web.mit.edu/kerberos/www/dialogue.html., Dec. 1988.

Neuman et al., "Kerberos: An Authentication Service for Computer Networks", pp. 1–11, USC/ISI Tech. Report #ISI/RS-94-399, http://nii.isi.edu/publications/kerberos-neuman-tso.html, and/or IEEE Communications Magazine, vol. 32, No. 9, pp. 33–38, Sep. 1994.

Orfali et al., "Essential Client/Server Survival Guide", pp. 105–128 and 147–160, Van Nostrand Reinhold Publishing Company, Dec. 1994.

Primary Examiner—Robert W. Beausoliel, Jr.
Assistant Examiner—Stephen C. Elmore

[57] ABSTRACT

A secured network permits a single sign-on ("SSO") of users to a plurality of network elements. Data structures, procedures and system components that support the SSO functionality in a distributed networked environment are included in the secured network. The SSO functionality can be implemented and integrated into an existing network platform or used as the backbone protocol to new network installations. DCE-based features as well as ERA and EAC can be utilized as the foundation for the implementation. The SSO functionality may be implemented and integrated without requiring significant low level development or major modifications in a network.

9 Claims, 12 Drawing Sheets

5,944,824

SYSTEM AND METHOD FOR SINGLE SIGN-ON TO A PLURALITY OF NETWORK ELEMENTS

TECHNICAL FIELD

The present invention relates to an improved data networking system and, more specifically, to an architecture and method that allows network users to achieve a single sign-on to a plurality of network elements.

BACKGROUND OF THE INVENTION

Data integrity and security are important aspects of computerized networks. This is especially true in computing environments, where users and resources are distributed over two or more physical locations. In such distributed networked environments, a premium is placed on the security mechanisms which dictate how users access attached network resources.

Various network security mechanisms have been developed which greatly enhance the overall security of Network Elements ("NEs") for users at all level across the network. The NEs can be switches, signal transfer points ("STPs"), mainframes, databases, or other similar resources and may be situated at great distances from the users. Typically, a user accesses the NEs through either a local area or wide area network. In some configurations, dial-up connections are also employed. In either case, the user must go through a series of authentication and authorization steps in order to gain access to a requested NE.

Local authentication mechanisms in the NEs may become unnecessary because of the availability of more sophisticated network authentication protocols for access control. In addition, NE local authentication, mechanisms may prove to be a burden for ordinary users as the number of NEs that are connected increases and the management of the different passwords on the different NEs becomes more difficult.

To overcome this difficulty, a user may use the same password for all NEs. When this is not possible due to different password management policies in the NEs, other methods may be employed. One common practice is to write down the passwords for easy access by the user and equally easy access by others. Ultimately, however, such methods may seriously compromise the security of the entire network.

Authentication mechanisms that are implemented in individual NEs, i.e., local authentication, have proven to be ineffective in networked environments. This is because the terminal used by a user to interact with the NEs may not be directly attached to the NEs locally. Consequently, all data communication between a user and an NE is subject to attacks on the connection between the user and the NE. Thus, user passwords for authentication purposes can be easily obtained, which breaks the security mechanisms in the NEs.

Furthermore, the local authentication mechanisms may prove to be a burden for ordinary users due to the requirement that multiple sets of user identifiers and passwords be remembered and used on different NEs respectively. This is partly because of the lack of uniform implementation of local authentication and difference in administration policies that are established in different types of NEs. Although these may be considered as desirable features for security, users tend to find various ways to overcome the inconvenience.

Typically, a user will use the same password for all NEs. When security policies make it difficult to do so, the management of the multiple passwords will become a nightmare for users. Posting or storing the passwords for easy access and retrieval seems to be the next natural move users normally take. The consequence is the compromise of security in the NEs.

To simply disable the local authentication mechanisms does not serve the purpose best. First, other local security mechanisms such as authorization may depend on them. Authorization mechanisms at the network server level can only perform to a limited degree at the NE level. Further access control to individual resources and information in an NE generally require and depend on local security mechanisms in the NE. Second, the diversity of NEs in a network makes it very difficult, if not impossible, to effectively and efficiently enforce access control directly from the network server. Third, for compatibility reasons and for smooth integration of network security in network server with local security mechanisms, it is desirable to make use of the local security mechanisms whenever possible.

Thus, what is needed is a network wide security system that can cope with security problems that local security mechanisms cannot effectively deal with.

SUMMARY OF THE INVENTION

The present invention is an architecture and method for a Single Sign-On ("SSO") that addresses system security and user password management concerns on a network-wide basis. The SSO of the present invention allows a user to log-on only once at a user station and a Security Server ("SS"), in turn, will automatically log the user on to all the NEs that the user is authorized to access. The invention takes advantage of the various network security provisions and integrates local user authentication processes currently found on Network Elements ("NEs") into the global network platform.

A primary advantage of the present invention is the total integration of a plurality of network security mechanisms including NE password protection, SSO capability control, password control, initiation, modification and recovery. In one embodiment the SSO uses the Distributed Computing Environment ("DCE") standard ensuring that evolution of DCE-based technologies will keep the SSO at the front of the security platform.

Another advantage of the present invention is the integration of network-wide authentication with local authentication in the NEs. This allows a user to authenticate only once to the network authentication service. Local authentication into an NE is performed automatically and is transparent to the user. This is based on the notion that the network authentication is visible to the local NEs so that the local security mechanisms would trust the network authentication result and make use of it to achieve local authentication for the user. As such, a strong network authentication service is disclosed which not only provides better security both for the network and for the NEs but also makes available the necessary information and procedures to the NEs in order to simulate local authentication functions on behalf of the user.

Yet another advantage of the present invention is that user identifiers and passwords for network authentication and those for the NE local authentication do not have to be the same.

Disclosed in one embodiment is a network architecture and method that integrates an SSO-based solution into existing network log-on and access functionality. Security mechanisms provide network authentication, credentials control and access control to NEs. The SSO provides the Network Security Administrator ("NSA") with the option to grant an individual user the SSO capability of being automatically logged on to the NEs that the user is authorized to access once network security checks are passed. A user who is not granted the SSO capability will still have to go through the two layers of authentication, namely, network authentication and NE local authentication, before the user finally gains access to the resources and information in an NE. When necessary, support for the Distributed Computing Environment ("DCE") is provided.

For a more complete understanding of the present invention, including its features and advantages, reference is now made to the following detailed description, taken in conjunction with the accompanying drawings.

BRIEF DESCRIPTION OF THE DRAWINGS

In the drawings.

Corresponding numerals refer to corresponding parts in the figures unless otherwise indicated.

DETAILED DESCRIPTION OF THE INVENTION

In the following detailed description a user shall mean and encompass a single user, a plurality of users or any one of a plurality of users. Likewise, a network element can be any single resource among a plurality of network elements or a group of network elements taken as a whole. Also, a node shall be understood to mean an entry point into a network and any other designated point of access, including a network device, switch or addressable network unit. Other similar connotations shall be opponent to those skilled in the art upon reference to this disclosure.

Figure 1:
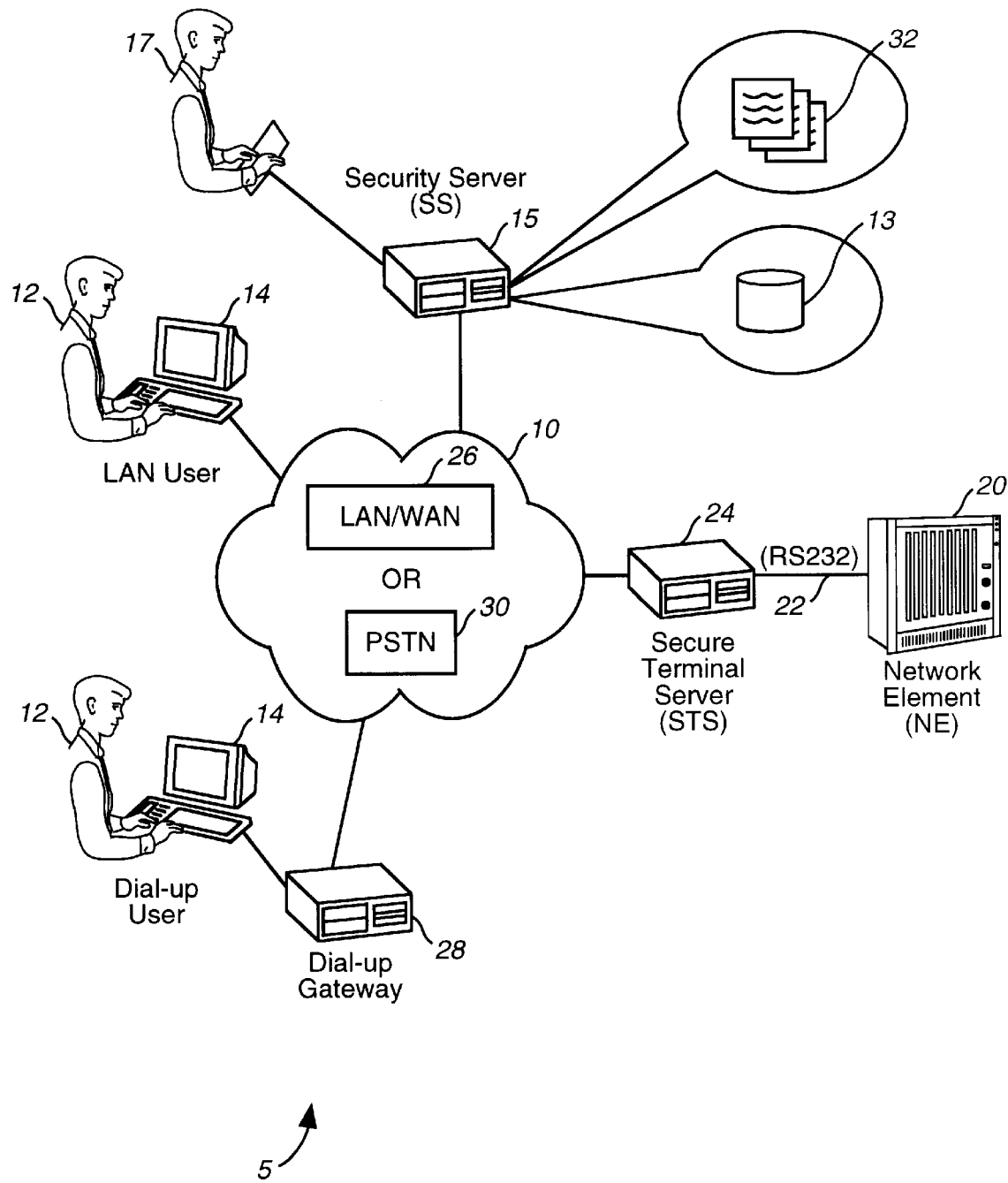
FIG. 1 is a high-level block diagram of a secured network according to one aspect of the invention.

In FIG. 1, the high-level architectural scheme for a secured network according to the invention is shown and denoted generally as 5. Secured network 5 is a network security architecture that protects accesses to a plurality of Network Elements ("NEs") 20. A user 12 obtains access by sending a request to one or more of the NEs 20, which goes through the network Security Server ("SS") 15.

The Network Security Administrator ("NSA") 17 controls who is allowed to access what NEs 20 by creating a user account record and defining the access privileges for the account in a centralized security database 13. All access decisions for user requests are made based on information retrieved from the database 13.

The security server 15 performs all the network security functions for the network 10 and maintains the various security mechanisms 32 as herein described. The security server 15 provides a security platform where all user data for security are stored, updated, retrieved, processed and distributed to other nodes across the network 10. In the preferred embodiment, the security server 15 verifies the authenticity of a user 12, establishes mutual trust between a user 12 and an NE 20, and determines the set of NEs 20 that a user 12 is authorized to access. The security server 15 also acts as the key distribution center for performing encryption and decryption functions.

The NE 20 includes any types of equipment that are essential to network operations such as a switch, an STP, a mainframe computer, a database, and other similar network devices. In one embodiment, the interface 22 that connects the NEs 20 to the network 10 platform is comprised of RS232 asynchronous serial ports, although other types of interfaces may be employed.

Also shown is a secure terminal server 24 which acts as the interfaces between the NEs 20 and the Internet Protocol ("IP") network 10. In the preferred embodiment, each secure terminal server 24 is co-located with the NEs 20 it serves and may serve more than one NE 20 at the same location. The secure terminal server 24 can be considered a gateway or bridging device to connect the NEs 20 to the IP network 10.

The user nodes 14 are where user access requests to NEs 20 originate. A node 14 typically consists of a personal computer, a mini-computer, a mainframe, or other similar apparatus. The user 12 may be connected locally via a LAN 26 to a secure terminal server 24 or remotely via the LAN/WAN or dial-up 28 configuration. However, it should be understood that the way is in which a user 12 is connected to the network 10 makes no difference as far as network security is concerned. This ensures that all access paths are subject to the same level of security checks and, therefore, are equally protected.

The dial-up gateway 28 provides the connection to a user 12 who accesses the network 10 through dialing into a Public Switched Telephone Network (PSTN)30. This broadens the ways in which users 12 can gain access to an NE 20. To the network security platform, however, it makes no difference whether a user 12 is connected via the dial-up mechanism 28 or a LAN/WAN connection 26 once the connection is established.

Figure 2:
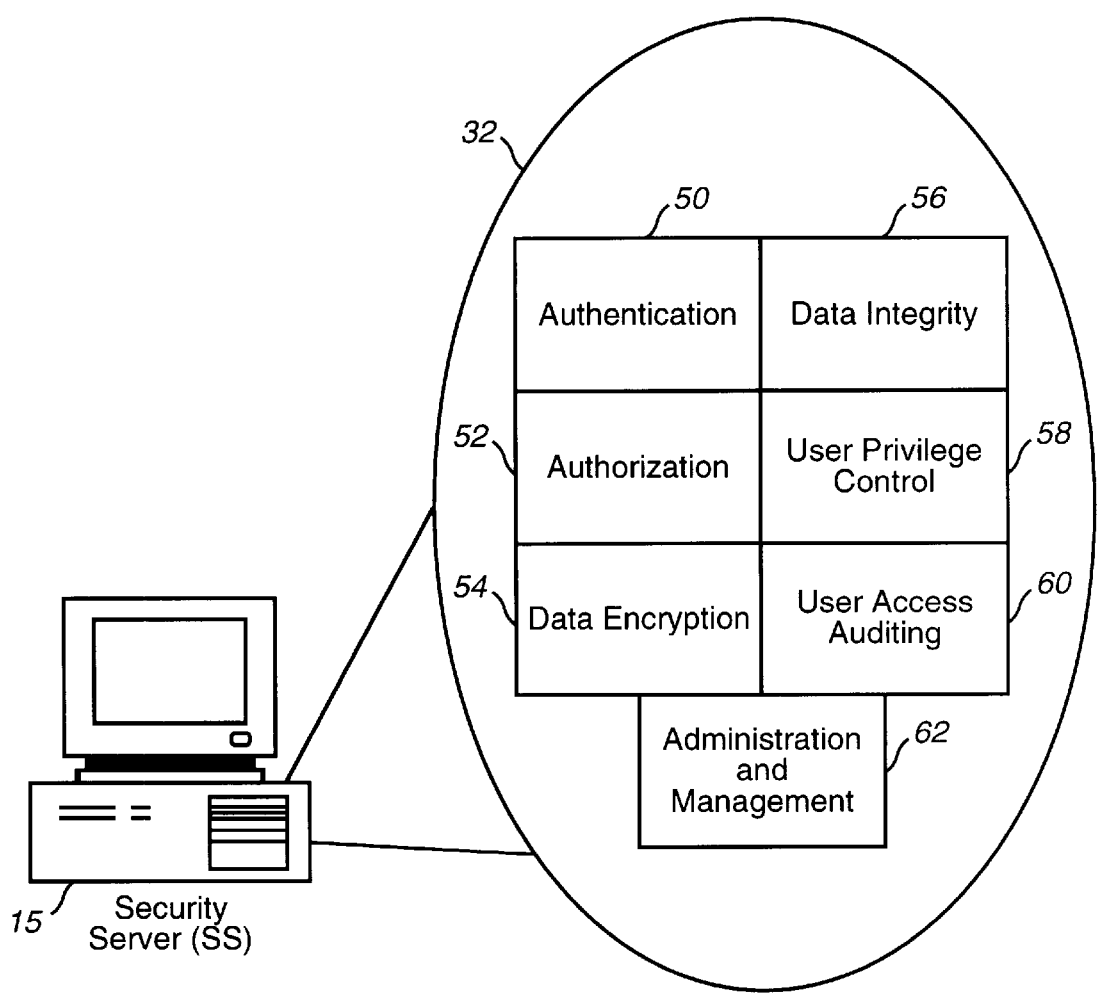
FIG. 2 is a high-level block diagram of a network architecture illustrating the security mechanisms according to one aspect of the present invention.

Turning to FIG. 2, the security mechanisms 32 that run on the security server 15 are illustrated in more detail. As shown, a plurality of security mechanisms 32 for the network 10 are provided and include application modules for authentication 50, authorization 52, data encryption 54, data integrity 56, user privilege control 58, user access auditing 60 and central system administration and user management 62. Various applications can be developed based on the core network security functions of the security mechanisms 32.

For the network authentication module 50, a request is sent to the user 12 station requesting a user identifier and a password. The user information will be checked against the information in the user profile of the central security database 13 at the security server 15. The network 10 establishes mutual trust between an authenticated user 12 and a specific NE 20 the user 12 requests to access. Therefore, network authentication 50 also assures the user 12 that the correct NE 20 is accessed.

For the authorization module 52, the network 10 determines the set of NEs 20 an authenticated user 12 can access. The access list is established based on the privilege of the user 12 and is provided to the user 12 once the authentication check is passed. The user 12 can simply choose from the list the desired NE 20 and is not even aware of the existence of the NEs 20 that the user 12 is not authorized to access. Thus, the level of access authorization in the network 10 applies to an NE 20 at the local NE 20 level. Further access control to individual resources and information in an NE 20 is enforced by the local access mechanisms available in the NE 20.

For the data encryption module 54, the network 10 not only ensures that user passwords are properly protected, but also provides the mechanism for encrypting regular traffic data between a user 12 and an NE 20 after a connection is successfully established. Thus, network 10 can be used to transmit sensitive information and as the foundation for the implementation of virtual networks.

In one embodiment, the network also supports a data integrity module 56 that is used to guard against accidental or malicious modification or destruction of data. The integrity module 56 of the security mechanisms 32 ensures that all data received from an NE 20 is accurate and those applied into an NE 20 are correct.

For the user privilege control module 58, a user privilege determines the set of NEs 20 a user 12 can access. Therefore, user privilege control 58 must reflect the policy of "need-to-know" that can be established based on the responsibility of the position of the user 12 inside a company. Change of user privilege can be easily made to reflect the present responsibility of the user 12, which in turn determines the access right of the user 12 to the NEs 20.

For the user access auditing module 60, the network 10 logs all user access attempts, be they successful or not to create an audit trail. In one embodiment, the information in the audit trail includes the user identifier, point of access, time of attempt and the success or failure of the attempt. The audit trail can be used by a network security administrator 17 for further investigation or for prosecution purposes. In addition, upon consecutive failed authentication attempts by a user 12, the user account can be disabled and the network security administrator 17 notified automatically.

For the central system administration and user management module 62, the network 10 allows system administration and user management to be performed in a centralized manner, meaning that an network security administrator 17 can perform all the security administration functions from the same terminal. This capability not only reduces the cost of system administration, but also ensures the consistency, correctness and effectiveness of appropriate security policies across the entire network platform.

In one embodiment, the authentication mechanism 50 in the IP network 10 uses the Distributed Computing Environment ("DCE") key distribution service based on KERBEROS™ authentication algorithm distributed by the Massachusetts Institute of Technology in Cambridge, Mass. All user authentication 50 is handled by the security server 15 which also establishes mutual authentication between a user 12 and a requested NE 20. Another property of the KERBEROS™ authentication algorithm is that user passwords are never transmitted in the network 10, whether clear or encrypted, which eliminates the threat of the open network to user passwords.

In still another embodiment, the authorization mechanism 52 in network 10 uses the DCE Cell Directory Service ("CDS") and the Access Control List ("ACL") mechanism applied to the CDS entries. This is accomplished by attaching an ACL to every NE list entry to decontrol which of the users 12 or which groups of users are allowed to access a particular NE 20. By employing a structured naming scheme for NE 20 and by using the group as the primary entity for access control, ACLs are sparsely populated in the CDS tree and can be mostly attached to a common root of a subtree.

In yet another embodiment, the encryption algorithm module 54 in network 10 uses the Data Encryption Standard ("DES") algorithm offered in DCE that takes a 56-bit secret key for the encryption and decryption of desired data. The use of temporary or session keys, which are DES keys, can limit the effective period of time of the keys and make the brutal attacks more difficult and less attractive to take place.

Figure 3:
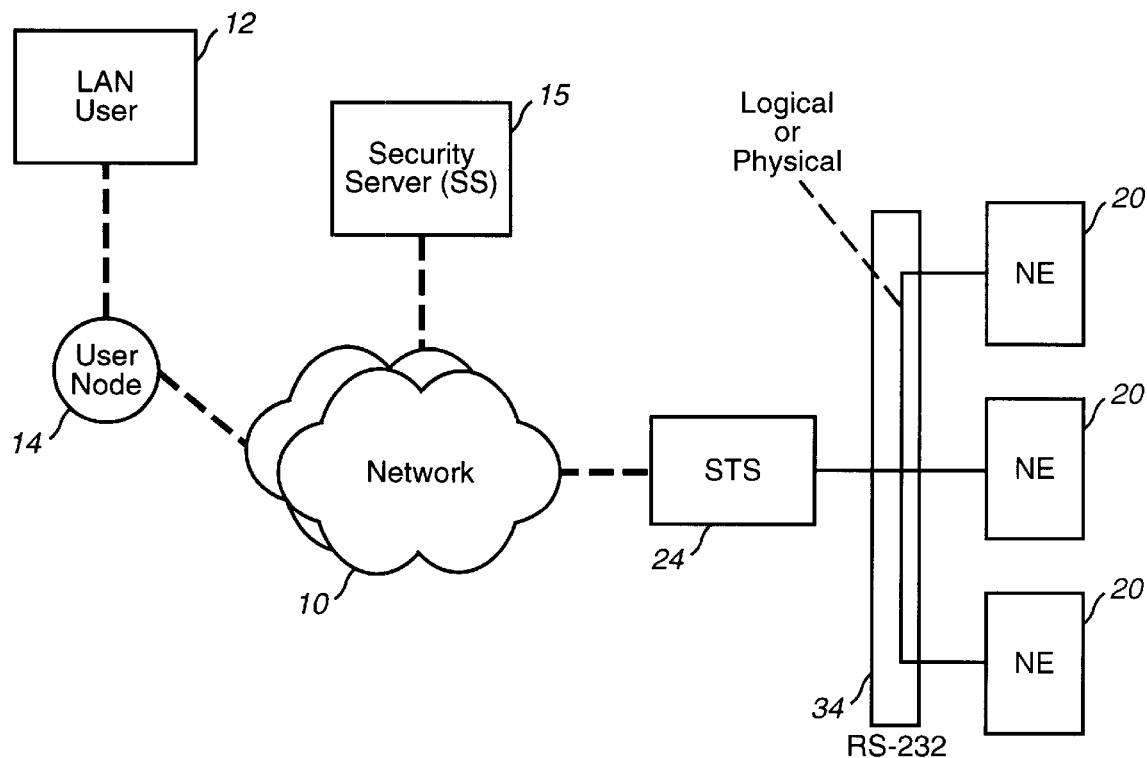
FIG. 3 is a high-level block diagram illustrating the interconnections between various nodes of a secured network according to one embodiment of the invention.

Turning now to FIG. 3, the interconnections between the various types of nodes in the network 10 are illustrated. The role of the user node 14 is to interface users 12 to the network 10 and to the NEs 20 that each particular user 12 needs and is allowed to access. The role of the security server 15 is to provide a secure network environment for a user 12 to connect to and access the NEs 20. The role of the secure terminal server 24 is to interface a number of NEs 20 to the network 10 for remote user access. The NE 20 is the ultimate destination that users 12 try to connect to and access information and other resources.

The connections between an secure terminal server 24 and the NEs 20 can be logical or physical depending on the capability of the NEs 20 to interface to the network 10 directly and to support the security policies implemented and enforced by the security server 15. In this regard, an RS232 connection 34 may be used to bring an NE 20 to the network 10 for user access. As the NE 20 connection 34 interface improves and necessary security capabilities are supported the hardware box that performs the functions of the secure terminal server 24 is no longer needed. Then, the connection between a secure terminal server 24 and an NE 20 can be considered a logical connection. Thus, in one embodiment the secure terminal server 24 and the NE 20 are merged into a single piece of hardware. All the interface requirements and security support will still have to be present.

It should be understood that due to various limitations of networking and security technologies, the network security that is imposed by the security server 15 will only cover the interconnections that involve the user nodes 14, the security server 15 and the security terminal server 24. No data flow between the security terminal server 24 and the NEs 20 is protected including user identifiers and passwords that are required by the NEs 20 to authenticate a user 12 before access to its information and resources can be granted. It should be understood that the SSO solution of the present invention simulates this local log-on process.

In short, the fundamental requirement for any SSO solution is that it be consistent with the overall security policies that are used for the development of the network security in the security server 15. When it is not possible to implement the same security mechanisms 32, an alternate method should be identified and shown to meet the requirement. Such security mechanism 32 may be implemented in a plurality of ways including by software or hardwired means maintained on the security server 15. Other means will be apparent to those skilled in the art.

Figure 4:
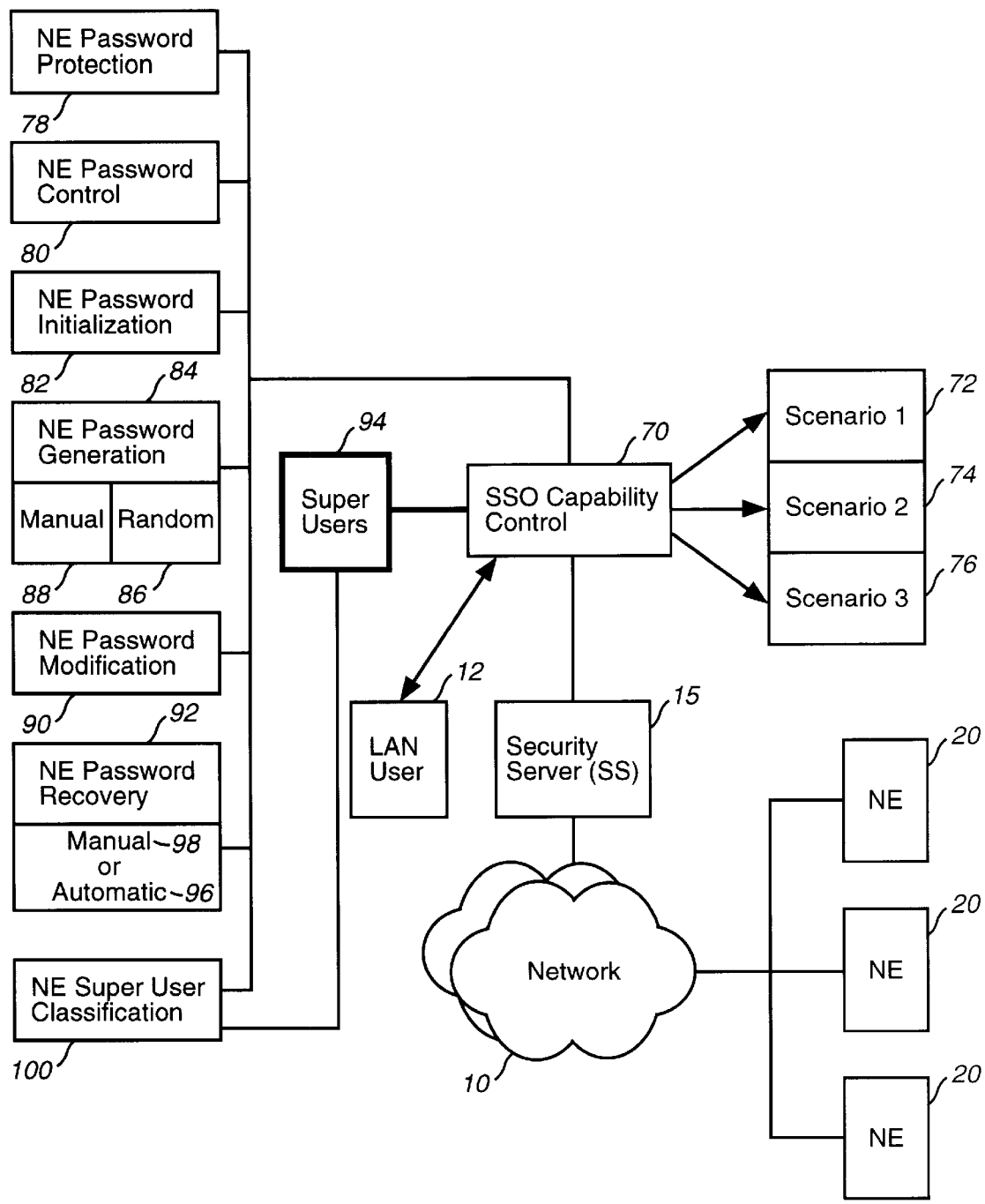
FIG. 4 illustrates specific requirements for a single sign-on solution according to one embodiment of the invention.

In FIG. 4, the specific requirements for the security mechanisms 32 are illustrated according to one embodiment of the invention. As shown, with the SSO capability control 70, the SSO solution gives the control 70 to the network security administrator 17. The control 70 can be requested by the administrative authority 17 for the network 10 and allows the network security administrator 17 to enable or to disable the SSO capability to individual users 12.

The control 70 can be applied to NEs 20 that a user 12 is authorized by the network security administrator 17 to access. In other embodiments, the control 70 can also be applied to a selected list of such NEs 20. This control 70 gives the network security administrator 17 the capability to discriminate user groups so that the more trusted groups, e.g., internal security groups and network support groups, can be granted the SSO feature. Casual users, e.g., vendors and other special users, are still required to exercise local log-on to some NEs 20 even though network authentication and access control in the network have cleared them for access to those NEs 20.

According to another embodiment of the invention, the control mechanisms 70 are written to allow three distinct scenarios. In a first scenario 72, a specific user 12 is granted the SSO capability to all the NEs 20 that are authorized by the network 10 for the user 12 to access. In a second scenario 74, a user 12 is denied the SSO capability to all the NEs 20 that are authorized by the network 10 for the user 12 to access. In a third scenario 76, a user 12 is granted the SSO capability only to a subset of the NEs 20 that are authorized by the network 10 for the user 12 to access.

NE password protection 78 is able to counter eavesdropping threats over the RS232 connection between an security terminal server 24 and an NE 20. Since all data flow over the RS232 connection is in a clear format, the connection becomes a weak point for attacking the entire system security. This is because the capture of the user identifier and password over the connection would allow the attacker to bypass the network security 32 and directly log on to the NE 20 with the user identifier and password, which would render the entire network security useless. As such, the present invention includes security mechanisms 32 in the form of NE password protection 78 that guard against such attacks so as to not cause threat to the overall network security.

Also shown is NE password control 80 wherein passwords can be set and reset by the network security administrator 17. The selection of a user password may be randomly determined and must meet the composition requirement set up by the administrator 17. This capability allows the network security administrator 17 to set the initial user password in the NEs 20 and to reset a password in case a user password needs to be recovered.

For a user 12 that is granted the SSO capability to an NE 20, the password for the user in the NE 20 doesn't have to be known by the user. Under such a circumstance, the random selection of the password would increase the security level due to the unpredictability of the password. Frequent update to the password would further boost the level of security in SSO.

With NE password initialization module 82, the initialization of a user password in an NE 20 shall be controlled by the network security administration 17 and reflected at the security server 15 and propagated to the proper NE 20. This requirement applies to all scenarios of user password initialization, whether the password is chosen manually or is generated automatically. This initialization 82 sets the initial environment for carrying out the SSO operations in the NEs 20.

NE password generation 84 involves the automatic selection of an NE password. For a user 12 with the SSO capability, NE password generation is totally random 86 while the manual 88 selection of an NE password for a user 12 without the SSO capability must comply with the password policy of the NE 20. The random 86 selection of an NE password requires that the next password to be generated cannot be deduced from the past history of the sequence of passwords generated. Otherwise, the level of security would be greatly compromised. Both the random generation 86 and manual password 88 generation methods shall comply with the password policy for the NE 20 for a user 12 without the SSO capability.

With NE password modification 90, user 12 initiated NE password changes are reflected at the security server 15. A user 12 is able to modify the password used to log on to an NE 20 after the user 12 is successfully connected to the NE 20 regardless of whether the log-on is performed by SSO or is required to be carried out manually.

The modification of the NE password must also be reflected in the security server 15 to ensure that SSO can be performed successfully in the future. It is also required to meet the needs of NE password control by the network security administrator 17 for password recovery. In addition, this requirement ensures the minimum impact on present NE password control where an authenticated user 12 is authorized to change the user password in the NE 20.

NE password recovery 92 for a user 12 requires the presence and authority of the "super user" 94 to an NE 20. The SSO of the present invention can be configured to support both automatic recovery 96 whereby a process is executed and manual recovery 98 whereby the network security administrator 17 is physically and securely connected to the NE 20 to reinitiate a user password.

In one embodiment, the security mechanisms 32 of the present invention contains at least one super user 94 that has the SSO capability. Thus, the security control on the different types of super users 94 is the same as that for the ordinary users 12 except that these users 94 are granted more privileges to perform administrative functions in an NE 20. The process for password recovery 92 can be implemented similarly to that of password initialization 82.

NE super user classification 100 involves the creation, definition and classification of super users 94 which extend from the requirements for NE password initialization 82 and recovery 92. One class of super users 94 are granted with the SSO capability and are used normally for the invocation of automatic NE user password initialization 82 and recovery 92. The password for these super users 94 will therefore be dynamically generated by the security server 15. The other class of super users 94 resemble those that exist today and correspond to network class that are responsible for the administration of the entire network security environment.

Figure 5:
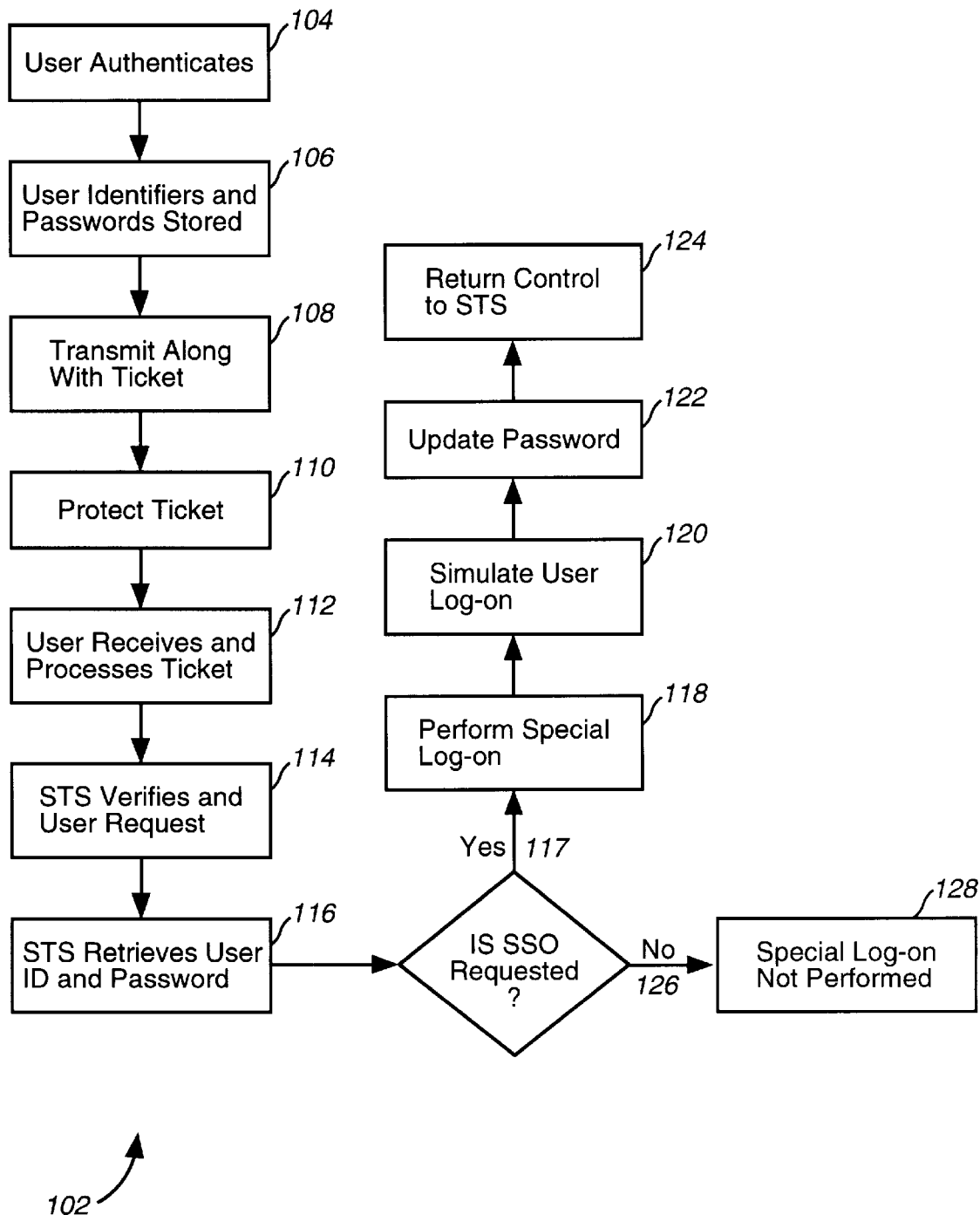
FIG. 5 is a process flow diagram for the single sign-on method according to the preferred embodiment of the invention.

Turning now to FIGS. 5, the process involved in the SSO method according to one embodiment of the invention is illustrated in more detail. The process, denoted generally as 102, is implemented in a plurality of network nodes. As such, it should be understood that the SSO method of the present invention is not a local issue specific to the users 12 or to the NEs 20. This is the result of the network security mechanisms 32 and the requirement to integrate SSO into the network environment. It should be understood, that besides the respective roles that the different nodes play in the network architecture, the SSO requires more functionality from the network nodes in order to support the functions of the SSO implementation.

The SSO process 102 starts after the user 12 has successfully performed authentication functions 104 to the security server 15. That is, the authenticity of the user 12 relies entirely on the security server 15. SSO functions are used primarily for providing convenience to the user 12 although they indirectly enhance the effectiveness of the overall security by relieving the user 12 from remembering and applying numerous passwords at different stages of system operation. This requires that strong network security mechanisms 32 be at the security server 15 that render the local authentication mechanisms in the NEs 20 to be of little value.

It will be understood by those skilled in the art, that the role of the different nodes throughout the network stays the same as far as network security mechanisms 32 (authentication, authorization, etc.) is concerned. To support the functionality of SSO, however, additional capability is required in the nodes. Specifically, the security server 15 node stores the user identifiers and passwords 106 to the NEs 20 a user 12 is allowed to access and will send them along with the ticket 108 to the user 12 in the response to a successful network authentication and NE 20 access request from the user 12. In this regard, the user identifier and password data in the ticket are protected 110 so that only the STS that serves the NE can retrieve them. Even the user 12 is not allowed to access the data.

The user 12 node must be capable of receiving and processing tickets 112 from the security server 15 which contain the user identifier and password data. The capability to retrieve and display such data is not available because it is unnecessary and insecure.

The secure terminal server 24 node is responsible for all the procedures involved in SSO. After the receipt of a user request to access an NE 20 connected to it, the secure terminal server 24 performs verification of the user request 114 and retrieves the user identifier and password data from the ticket in the user request 116. If SSO is requested 117, a special log-on procedure particular to the NE 20 will be invoked 118. The procedure uses the supplied user identifier and password to simulate a user log-on 120 to the NE 20 and updates the password 122 in the NE 20 to a new value selected and sent together with the other data for SSO before returning control back to the security terminal server main procedure 124.

If SSO is not indicated 126, the log-on procedure will not be performed 128. Thus, the log-on procedure of the present invention, is performed in addition to all the other functions presently performed by the secure terminal server 24 node for network security. In the preferred embodiment, the NE 20 node is transparent to SSO. Therefore, no change is required in the security and control functions in the NE 20 for support of SSO.

Figure 6:
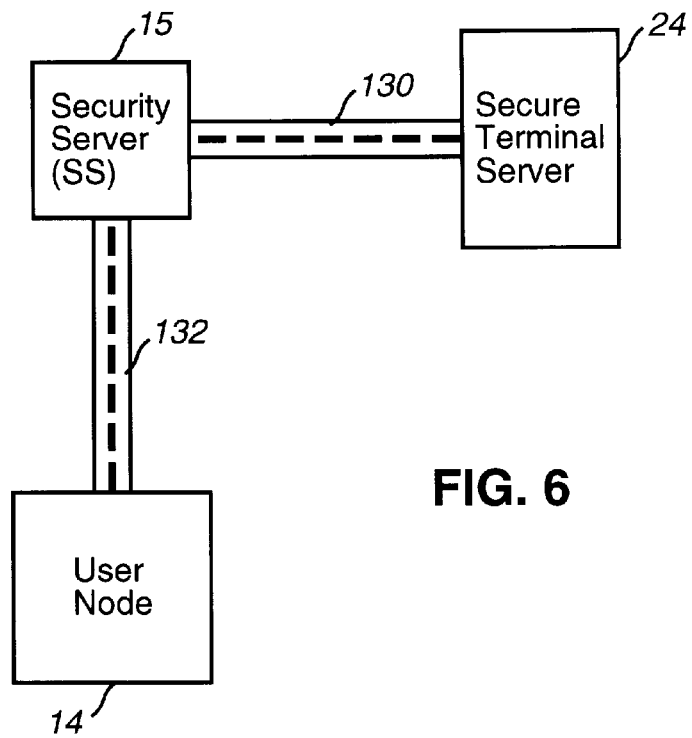
FIG. 6 illustrates the interactions between various nodes of a secured network according to one embodiment of the invention.

Turning now to FIG. 6, the interaction between different nodes in the network 10 is illustrated. As shown, there are two basic types of interactions. The first interaction 130 is between the security server 15 and an secure terminal server 24. This interaction 130 is primarily needed for user password initialization 82 and recovery 92 and do not have to involve the user 12 node. Preferably, these procedures are initiated and controlled by the network security administrators 17. User password initialization 82 is performed when user 12 access to an NE 20 is configured into the security server 15. User password recovery 92 is performed in the same fashion but may be carried out through a different administration interface because user access to the NE 20 has been defined at the time of password recovery 92.

The second type of interaction 132 also involves the user node 14. The flows are between a user node 14 and the security server 15 and then between the user node 14 and a secure terminal server 24. This interaction 132 occurs in normal SSO process. First, the user performs authentication 104 to the security server 15 which ultimately returns to the user a ticket 108 for user access to a specified NE 20. Included in the ticket are the user identifier and passwords data necessary for the user 12 to log on to the NE 20 and for the update of user password in the NE 20. The ticket is encrypted in such a way so that even the user node is not able to decrypt it and retrieves the data. Only the secure terminal server 24 that serves the NE 20 is capable of doing so.

Second, the user node 14 passes the ticket to the secure terminal server 24 that serves the NE in its access request. The secure terminal server 24, upon verification of the user request 114, retrieves the user identifier and password data from the ticket 116 and invokes a routine 118 that simulates the log-on process 120 particular to the NE 20 by using the received user identifier and password data. Before control is returned back to the SSO main routine 124, the user password in the NE 20 is also updated 122 with the one supplied in the ticket. The SSO function is now considered done which should not be in conflict in any way with other security functions that are performed in the secure terminal server 24 node.

Figure 7:
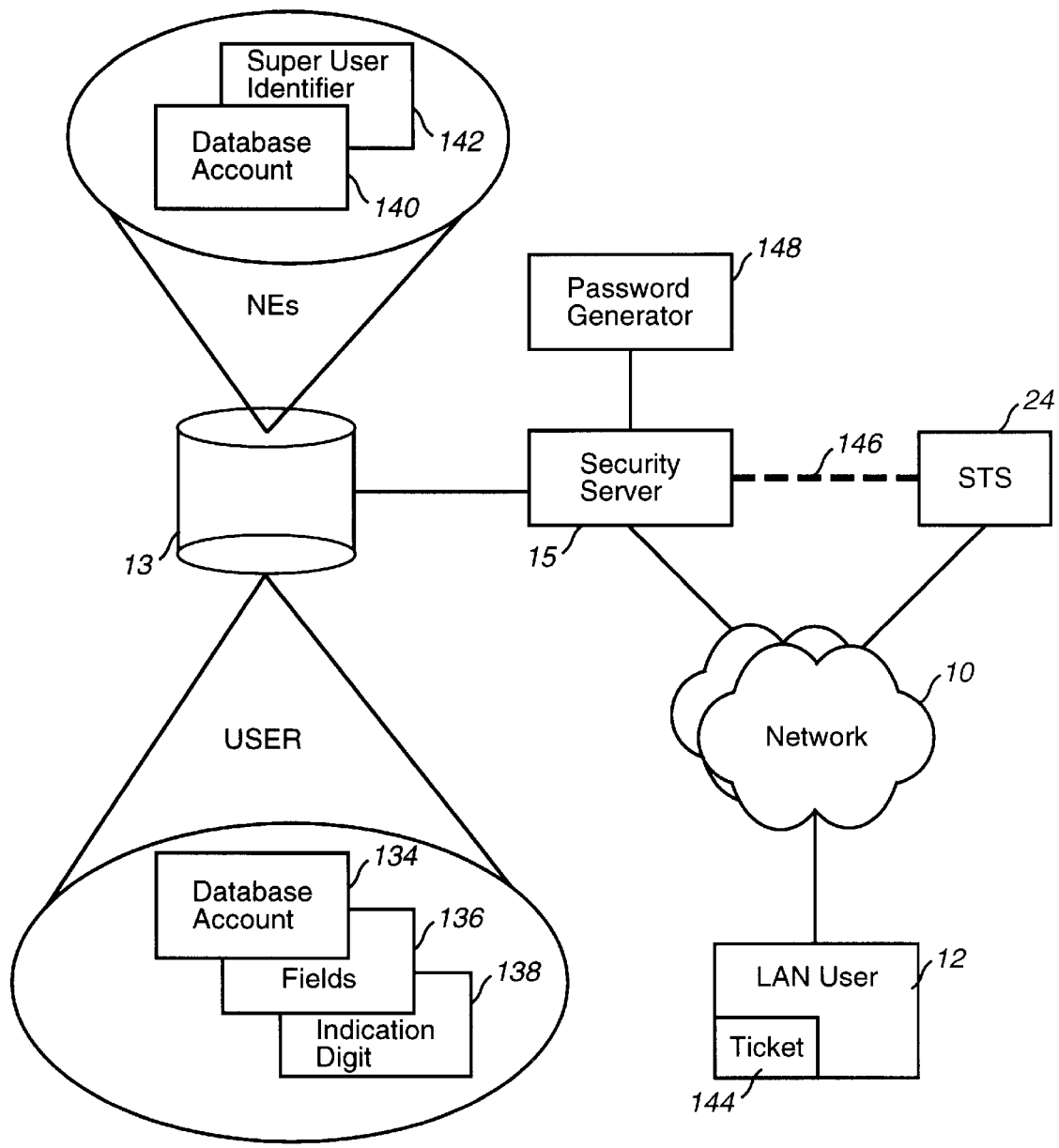
FIG. 7 illustrates various requirements of the security database employed by the security server according to one aspect of the invention.

According to the preferred embodiment, there are certain requirements in the data structure definition of the security database 13 in the security server 15 and in the security messages and tickets that are fundamental for the support of SSO. These requirements are illustrated in FIG. 7. In the security database 13 where records that define user accounts and NE 20 information are stored, the following items are needed to support SSO according to one embodiment of the invention.

In the database account for a user 134, the following data fields 136 are defined and added for each user account:

<SSO Indication Digit>
<$NE_1$, User Log-on Identifier, Present Password, New Password>
<$NE_2$, User Log-on Identifier, Present Password, New Password>
<$NE_n$, User Log-on Identifier, Present Password, New Password>

The "SSO Indication Digit" 138 specifies whether SSO is allowed for this user. If the indication 138 is that the user is not allowed, the list following it shall be ignored in its entirety. If the user is allowed, then the existence of an item for the specified NE in the list determines whether the user is allowed the SSO capability to that particular NE. This enhancement only affects the security server 15 node in the security database 13.

In the database account for an NE 140, the following data fields are defined and added for each NE account:

<Super-User Log-on Identifier, Present Password, New Password>

The "Super-User Log-on Identifier" 142 should be different from the one that is used by network security administrator 17 for interaction with the NE 20. The existence of this separate super user identifier 142 supports the implementation of SSO. The super user 94 requires the privileges to create regular user accounts, to set up the initial user passwords, and to change user passwords in the NE 20. This enhancement only affects the security server 15 node in the security database 13.

In the ticket 144 acquired by a user from the security server 15 for access to an NE 20, the following fields are defined and added in the ticket for the NE 20:

<SSO Indication Digit>
<NE, User Log-on Identifier, Present Password, New Password>

Depending on the particular application or implementation, other data may be present in addition to the above. For example, the entire list of <NE, User Log-on Identifier, Present Password, New Password> may be included. This will free the security server 15 from processing the list, however, the duty is passed on to the secure terminal server 24. This is a performance consideration which can only be determined in real implementations.

It should be understood that the security server 15 and the secure terminal server 24 nodes must be able to process the data in a ticket. The user 12 node shall be able to receive and recognize tickets with the enhancement, but does not have to deal with the data. On the other band, it is not able to process the data because they are encrypted at the security server 15 node which can only be decrypted by the secure terminal server 24.

Other new information exchanges 146 might be introduced between the security server 15 node and the secure terminal server 24 node that do not involve the user nodes 14. Such exchanges 146 are needed for user password initialization 82 and recovery in an NE 20.

A random password generator 148 is required in the security server 15 node. Passwords thus generated 148 shall meet the length and composition requirements for the user passwords.

Figure 8:
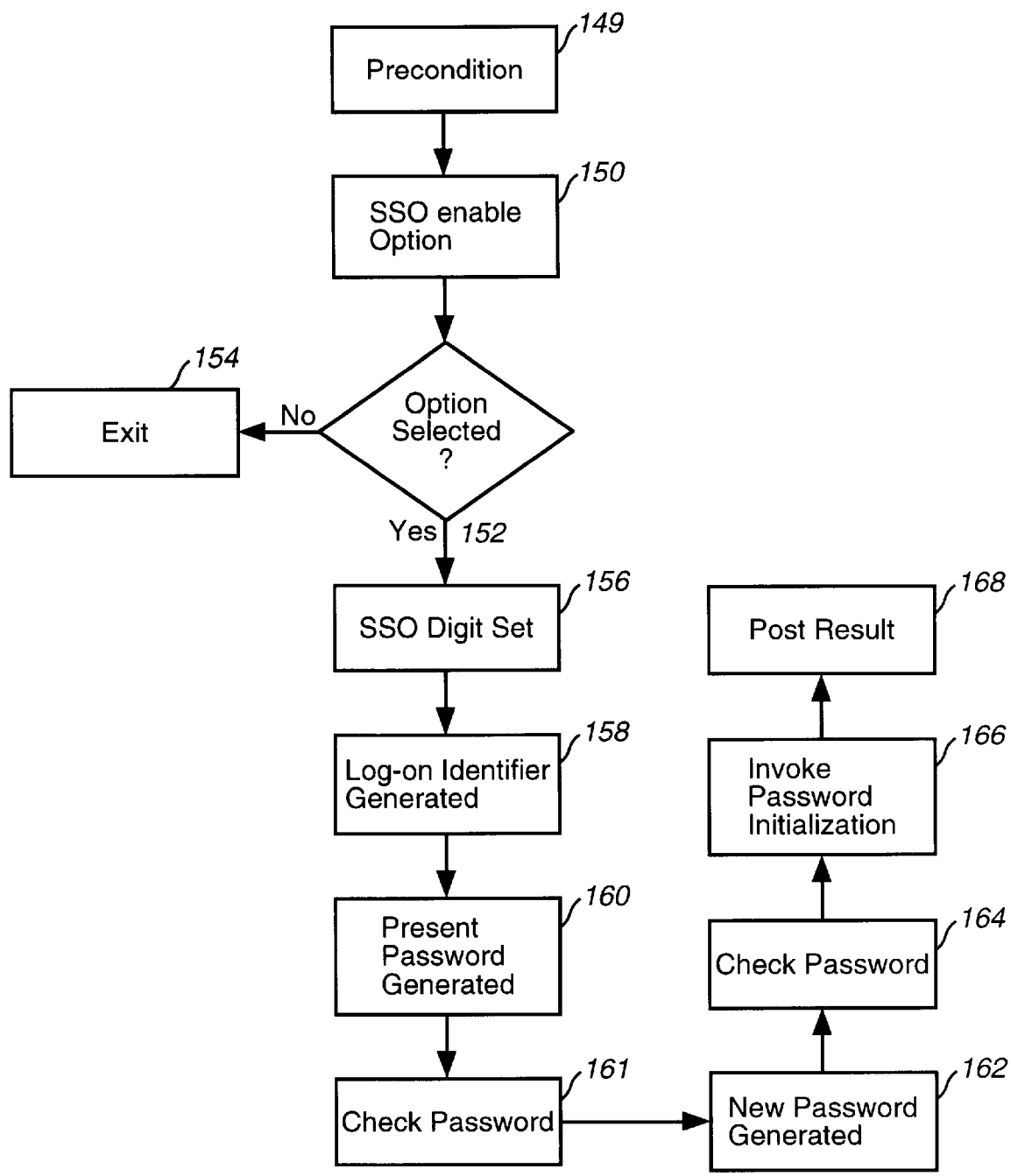
FIG. 8 is a process flow diagram for enabling a single sign-on capability according to one aspect of the invention.

Turning now to FIG. 8, the procedures that meet the SSO requirements according to one embodiment are therein illustrated. In particular, the SSO capability control module 70 makes the network security administrator 17 determine which user 12 is allowed the SSO capability based on the corporate security policies the network security administrator 17 follows. The procedure is invoked at the time a user account is created or modified. It is available only to a user 12 with the network security administrator 17 privileged the steps of the procedure are as follows:

Precondition 149: A user account is being created or modified for access to an NE 20 by an network security administrator 17. The network security administrator 17 who is carrying out this task is an authenticated user to the security server 15.

An option is presented for enabling the SSO capability for this user account 150. If the option is selected, the process continues 152, otherwise, exit the procedure 154. Next, the <SSO Capability Indication> digit 156 is set to indicate the SSO capability for this user account. The <User Log-on Identifier> is generated 158 for the NE. The identifier can be constructed based on the user account information and/or the identifier of the NE as long as it is a unique user identifier in the NE.

The process continues wherein the <Present Password> is generated 160 either by the invocation of the random password generator 148 or by the manual entering of a password. The password will be checked against the password policy to ensure its integrity 161.

The <New Password> is generated 162 either by the avocation of the random password generator 148 or by the manual entering of a password. The password will be checked 164 against the password policy to ensure its integrity. Finally, the password initialization procedure is invoked 166 to set the <User Log-on Identifier> and <Present Password> in the NE for this user account.

Post result 168: <NE, User Log-on Identifier, Present Password, New Password> is created for the user account and set up in the NE if the SSO capability is selected for this account.

Figure 9:
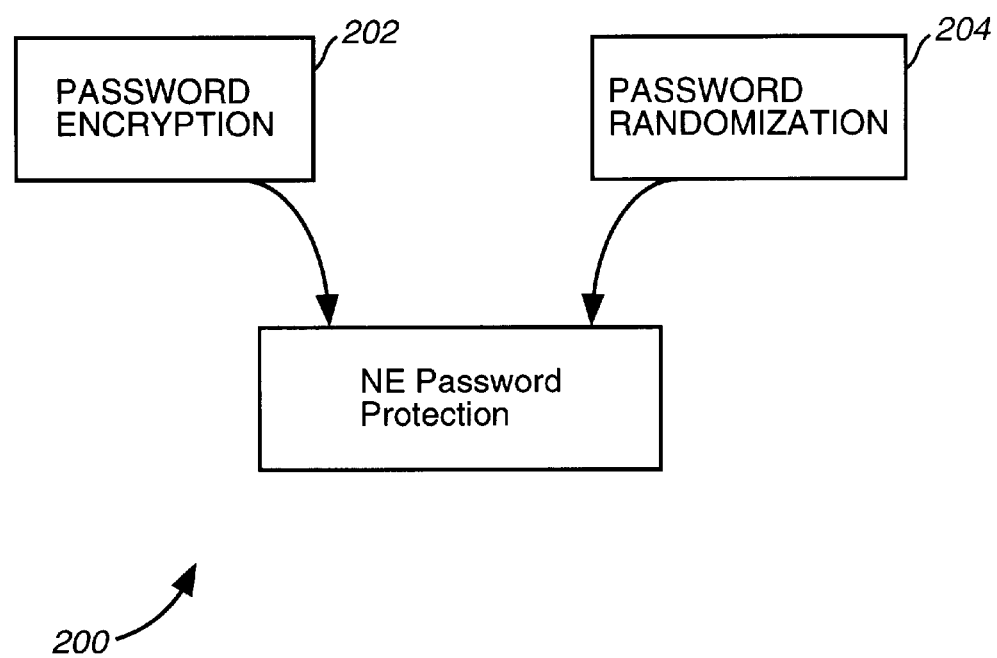
FIG. 9 is a process flow diagram for an NE password protection method according to one embodiment of the invention.

Turning now to FIG. 9, the process of NE password protection is illustrated and denoted generally as 200. As shown, process 200 is accomplished by two mechanisms: password encryption 202 and randomization 204. The encryption mechanism 202 is used for password protection in the LAN/WAN network environment. Whereas, the randomization mechanism 204 is used to deal with the RS232 connection between an secure terminal server 24 and an NE 20. This takes into consideration certain limitations in technology wherein the encryption process 202 cannot be extended beyond the secure terminal server 24.

In such an environment, an effective way to protect clear NE passwords over the RS232 connection is through randomization 204 of the NE passwords. An implementation of the randomization process 204 uses one time NE passwords. This requires the synchronization of the one time NE passwords between the security server 15 and the NEs 20. The use of two passwords, the <Present Password> and the <New Password>, in the ticket for a user to access an NE 20 serves to accomplish the goal.

The LAN/WAN portion 26 of the SSO architecture is not affected by SSO because encryption 202 has already been a part of the basic security mechanisms 32. That is, all data traffic in the LAN/WAN 26 is encrypted 202. The data are decrypted at the secure terminal server 24 before they are sent over the RS232 connection 34 to the NEs 20.

The use of a NE password pair serves to randomizing 204 the NE password. After an secure terminal server 24 logs on to a connected NE 20 on behalf of a user 12 by using the <Present Password>, the NE password for the user 12 is updated to <New Password> by the secure terminal server 24 executing a change password routine with the NE 20. The user 12 is securely connected to the NE 20 only after the above operations succeed. There are no special procedures required for NE password protection 200 besides those that are involved in normal user log-in into an NE 20.

According to one embodiment, a requirement that password be under the control of the network security administrator 17 is used. Not only does this centralized control maintain the overall level of security, but it also simplifies other procedures that are part of the SSO implementation, such as NE password recovery 92 due to the loss of user passwords or the failure of the system. NE password control by network security administrator 17 is embodied in the architecture of FIGS. 1 and 2 that enhance the user account records and require the development of additional procedures for SSO as described herein. Consequently, there is no special procedures required for NE password control.

According to one embodiment, NE password initialization is done at the security server 15 node by a network security administrator 17. It is preferred that the initial password be randomly generated 86 although manual generation 88 may also be an option. Since the way in which the initial password is generated does not make any difference as far as security is concerned and since the initial password is used as a one time password any way, random generation 86 is preferable for convenience and for uniqueness.

Figure 10:
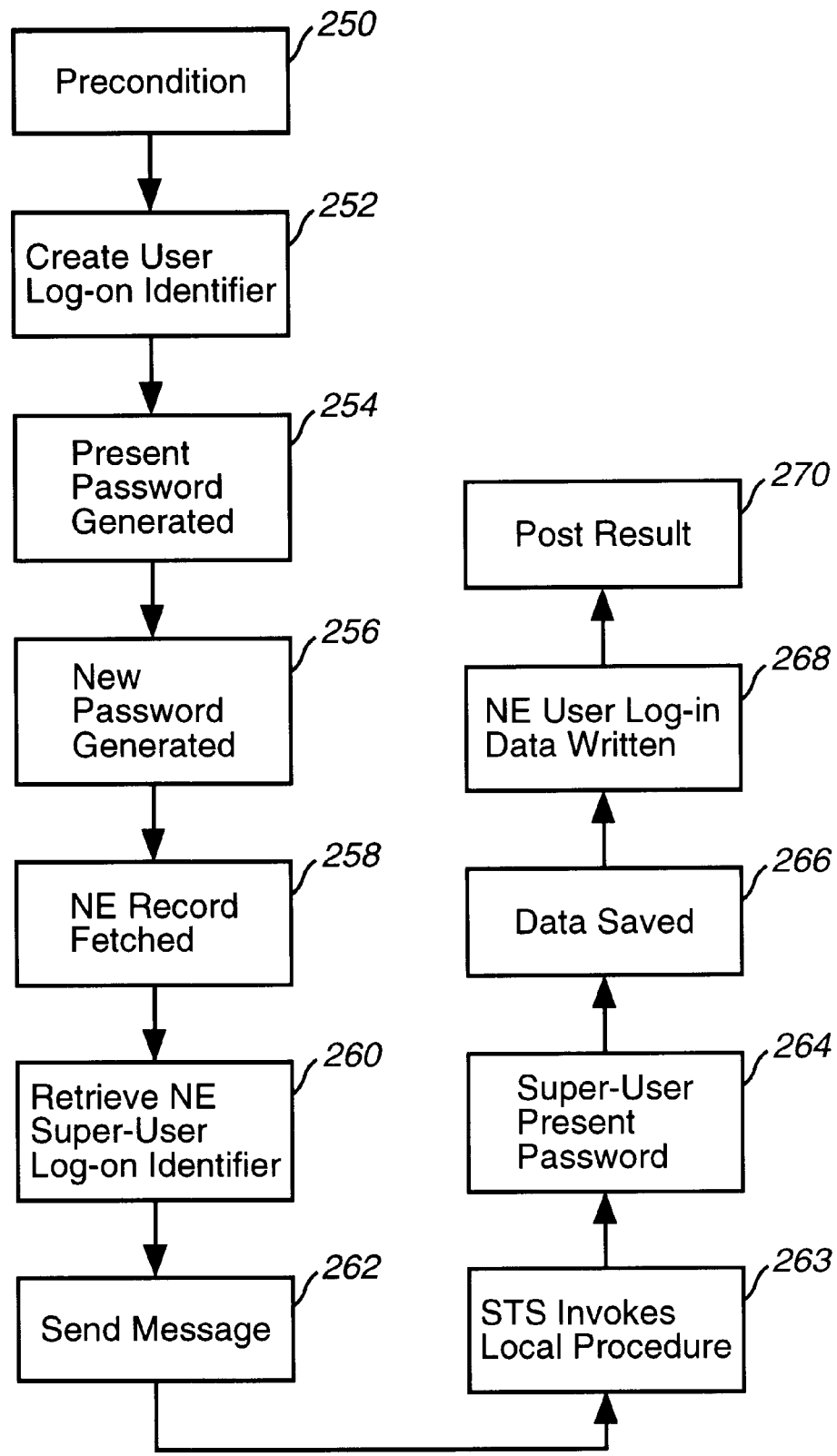
FIG. 10 is a process flow diagram for the NE password initialization method according to the embodiment of the invention.

Note that if the network security administrator 17 decides to force the user 12 to manually log in to an NE 20, NE password initialization 82 is not needed and the process is bypassed. Otherwise, FIG. 10 illustrates the process performed during NE password initialization.

Precondition 250: A user account is being created or modified. Access by the user 12 to an NE 20 is defined and the user 12 is granted with the SSO capability to this NE 20. The network security administrator 17 who is carrying out the task is an authenticated user to the security server 15 node.

The <User Log-on Identifier> is created 252 randomly or manually for the user account. The <Present Password> is created 254 randomly or manually for the user account. The <New Password> is created 256 randomly or manually for the user account. Next, the NE record is fetched 258 from the security database 13 at the security server 15 node. The <Super-User Logon Identifier, Present Password, New Password> for the NE is retrieved 260 from the record.

At this point, the process continues when a message containing <Super-User Log-on Identifier, Present Password, New Password> for the NE along with <NE, User Log-on Identifier, Present Password> for the user account is sent 262 to the secure terminal server 24 that serves the NE. The secure terminal server 24 invokes a local procedure 263 that performs the log-in sequence of the NE 20, logs in as a super user, creates or resets the user account in the NE 20 changes the super user password to a new one using the data provided in the message. The security server 15 returns control to the main procedure at the security server 15 node on successful completion of the steps.

Next, the <Present Password> for the super user is set 264 to the value of <New Password> in the same record and set the <New Password> for the super user 94 to a randomly generated one. This data is written 266 into the super user account in the security database 13 at the security server 15. The process continues with the <NE, User Log-on Identifier, Present Password, New Password> written 268 into the user account in the security database 13 at the security server 15.

Post result 270: The user password entry is created for the user account and is synchronized with that in the NE 20.

Figure 11:
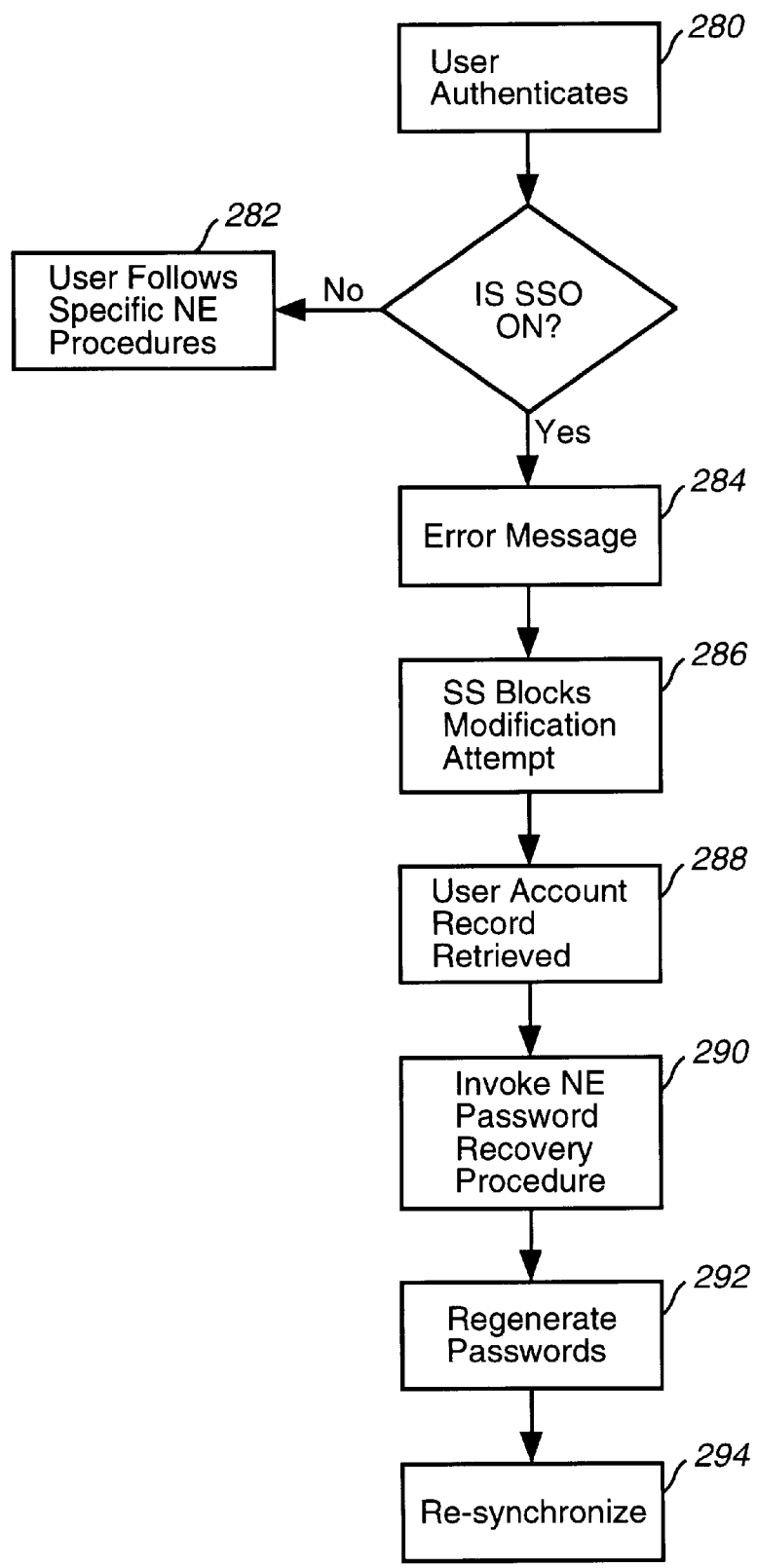
FIG. 11 is a process flow diagram for the NE password modification method according to the embodiment of the invention.

In FIG. 11, the process of NE password modification for a user account in the NE 20 is shown. The process can be initiated 280 by the user 12 after a successful authentication of the user 12 to the security server 24 node. Password modification should work only in the cases where the user is not granted the SSO capability to this specific NE 20. It should be understood, however that this capability can be made available to all users.

To the SSO subsystem, the modification request is the same as any other data flow that the user sends to the NE 20. Therefore, there is no interaction between SSO and NE password modification. After a secure connection is established between a user 12 and an NE 20, the user 12 just needs to follow the steps 282 specific to the NE 20 that lead to the change of a user password in the NE 20.

On the other hand, if the SSO capability is ON, the user 12 should expect to receive an error message 284 back in response to the request for NE password modification because the user does not know the random password set for the user account in the NE 20. It may be desirable for the security server 15 to block 286 such attempts from the user. This is because if the user were successful in guessing and modifying the random password, the synchronization of the password for this user account in this NE would be destroyed, which will cause the failure of all future SSO attempts to this NE. The security risk in this case is the same as any other malicious attempts for compromising passwords. In one embodiment, the security server 15 itself guards against these types of threats effectively through rigid password composition rules for user passwords in the NEs 20.

If automatic NE password recovery is desired, the procedure is the same as that for password initialization after the retrieval of the user account record 288 from the security database. The procedure is invoked as if the <NE User Log-on Identifier, Present Password, New Password> were just created 290. The passwords may be regenerated if desired 292. The procedure will re-synchronize 294 the user password for the security server 15 and the NE 20 which is the purpose of password recovery.

If the implementation only supports the manual NE password recovery, the network security administrator 17 has to physically log in to the NE 20 to set up password for the user 12. In this case, there is no interaction between the SSO subsystem and the base security system and there is no procedure to be executed in this case.

Preferably, more than one type of super users are required for an NE 20. One is used under normal circumstance for carrying out tasks in the NE that require the intervention of a super user. Since it might be frequently used, the passwords for this type of super users are randomly generated as outlined above.

The other type of super users are for the network security administrator 17 to deal with situations in an NE 20 that none of the procedures requiring a super user password would work. These super users are used only under extreme circumstances and the security risks associated with them is minimal.

Figure 12:
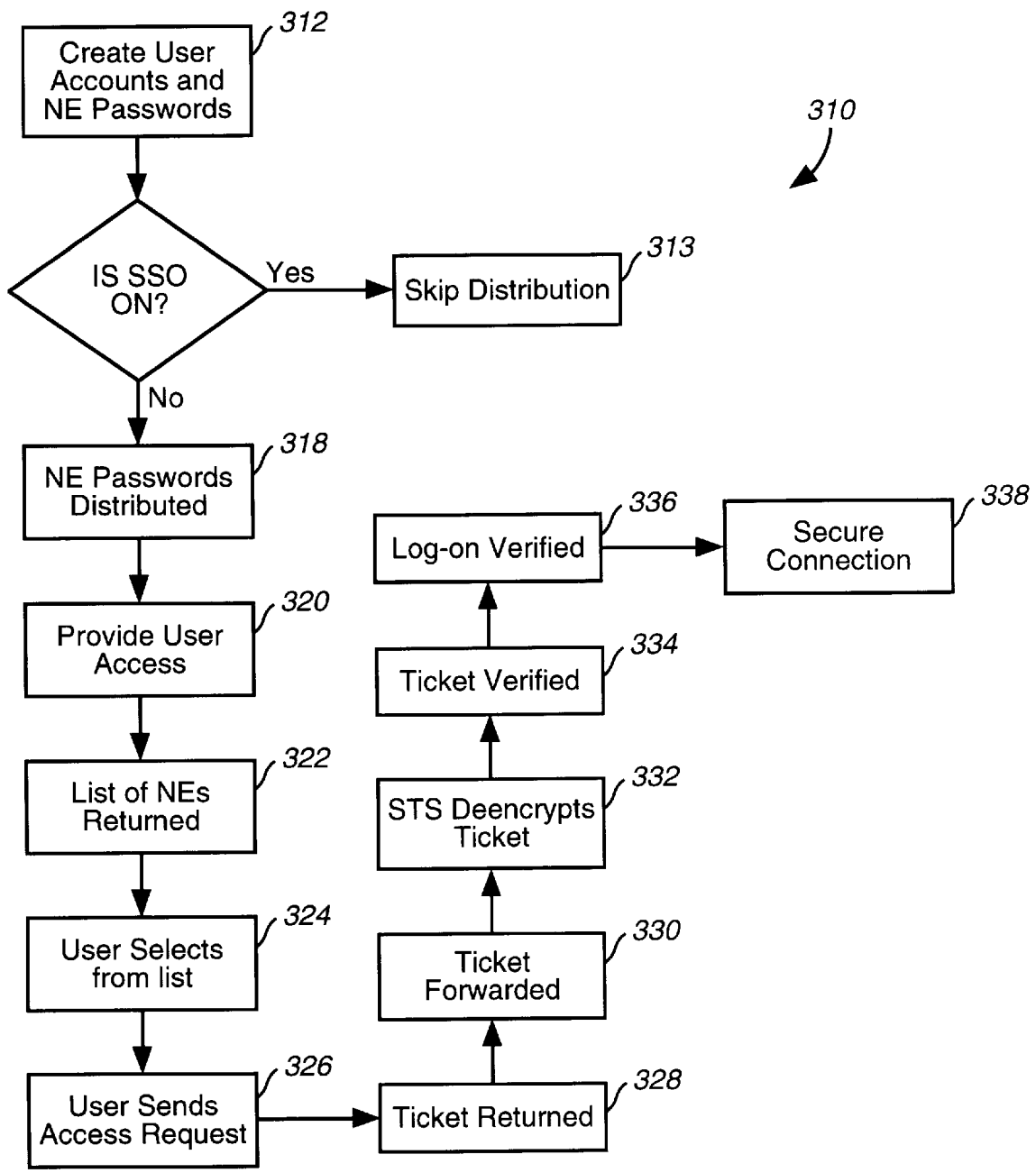
FIG. 12 is a process flow diagram gaining access to an NE authorized network element.

The process by which a user gains access to NEs is shown in FIG. 12 and denoted generally as 310. The process commences when a user account and NE password are created 312. Next, the user NE Password is distributed. This is the responsibility of the network security administrator 17 and the user. If the SSO capability is turned ON, no distribution 313 is necessary for the user does not need to be aware of the password to log on to an NE and all log-on-processes will be automatically performed.

If the SSO capability is not turned ON 318, distribution 314 of the user password to an NE can be achieved in the same way as that for the distribution of the user password to the network authentication service at the security server 15 node, which is a matter that needs to be addressed by system administration and key management.

Next, user access to an NE 20 with SSO capability is provided 320. This is the responsibility of the user 12. The user 12 authenticates to the security server 15 node, and is returned 322 with a list of NEs 20 the user is allowed to access. As shown, the user selects 324 the desired NE from the list and sends the access request 326 to the SS node. A ticket is returned 328 from the security server 15 node that contains the SSO data: <NE, User Log-on Identifier, Present Password, New Password>which are encrypted and invisible to the user.

The ticket is forwarded 330 to the secure terminal server 24 that serves the NE 20 along with the request to establish a secure connection 332 between the user 12 node and the NE 20. The secure terminal server 24 deencrypts the ticket 332, verifies the validity of the ticket 334, and simulates the log-in procedures 336 of the NE using the user data retrieved from the ticket. This should result in a successful response from the NE 20. A secure connection is established 338 between the user 12 node and the NE 20.

Figure 13:
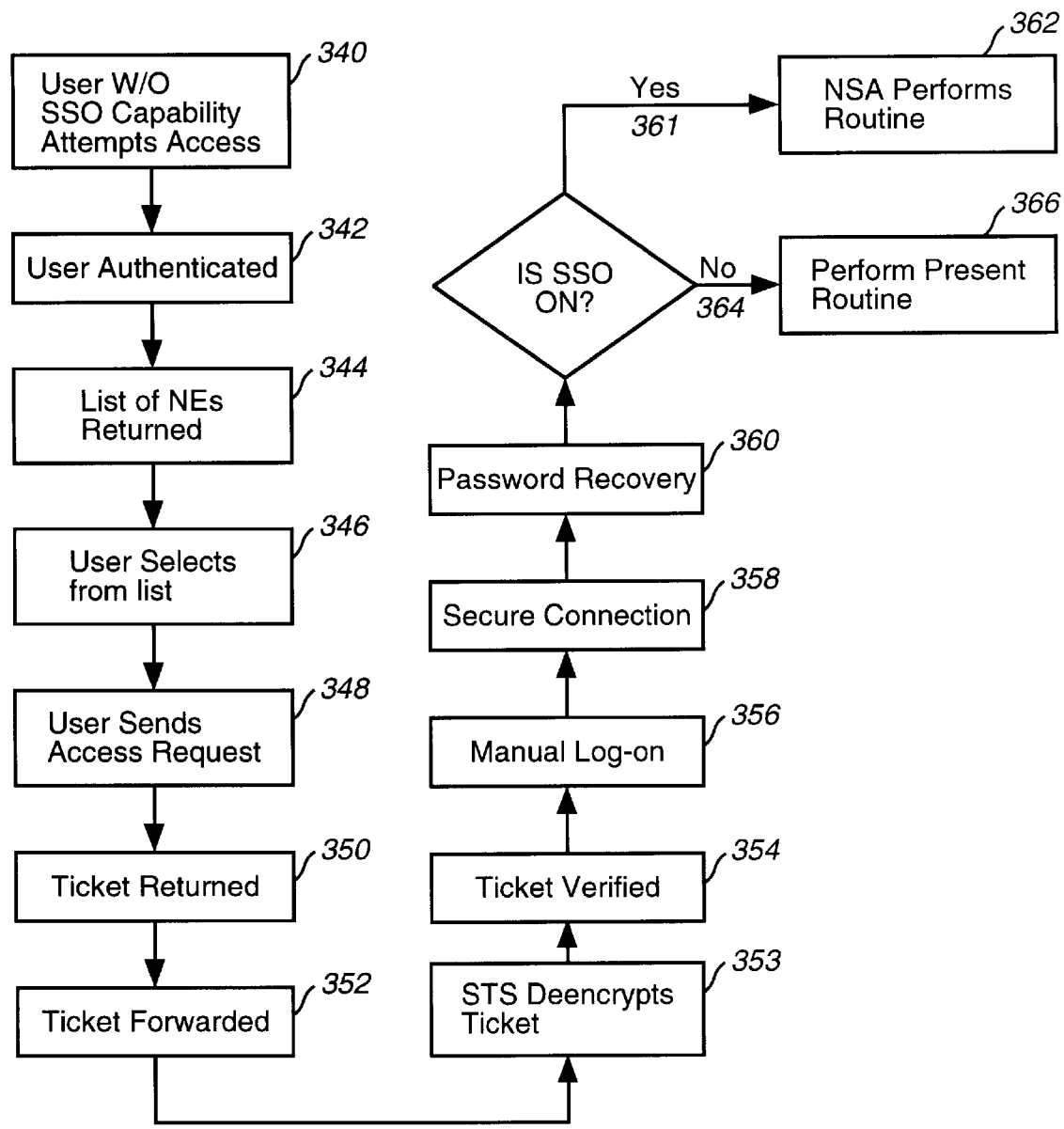
FIG. 13 is a process flow diagram showing access by user without the single sign-on capability.

The process for user without SSO capability is shown in FIG. 13. If a user without SSO capability wishes to access 340, the user is first authenticated 342 to the security server 15 node and a list of NEs the user is allowed to access is displayed 344. The user then selects the desired NE 346 from the list and sends the access request 348 to the security server 15 node. At this point, a ticket is returned 350 from the SS node that may or may not contain the SSO data: <NE, User Log-on Identifier, Present Password, New Password>.

The ticket is forwarded 352 to the secure terminal server 24 that serves the NE 20 along with the request to establish a secure connection between the user node and the NE. The secure terminal server 24 decrypts the ticket 353, verifies the validity of the ticket 354 and connects to the NE 354. The user manually performs log-on 356 following the sequence of NE prompts. A secure connection is established 358 between the user node and the NE.

Next, the process continues with user password recovery in an NE 360. This the responsibility of both the network security administrator 17 and the user 12. If the SSO capability is turned ON 361, the network security administrator 17 performs the password recovery routine 362 outlined above. If the SSO capability is not turned ON 364, the procedure for password recovery is the same as what it is presently done 366 and distributed without SSO capability.

For the steps of user account and password deletion, the network security administrator 17 logs on to the security server 15 node and acquires the necessary privilege-to perform such functions. The network security administrator 17 fetches the user account and for each <NE, User Log-on Identifier, Present Password, New Password>, retrieves the <Super-User Log-on Identifier, Present Password, New Password> record. Next, a message is sent to instruct the secure terminal server 24 that serves the NE 20 to use the <Super-User Log-on Identifier> to log on to the NE 20, to delete the named user from the NE 20, and to replace the super user password with the new one provided Upon successful return, the NE record is updated with the <Present Password> being replaced with the value of the <New Password> and the <New Password> with a random new password value.

In one embodiment, the network architecture of the present invention uses Distributed Computing Environment ("DCE") based technologies that provide network authentication, authorization and data encryption. This implementation facilitates centralized system administration and user management. All user account and NE data are maintained in a database, called DCE registry, at the SS node.

As is understood by those skilled in the art, the Extended Registry Attribute (ERA) feature can be used as part of the DCE standard. ERA allows the inclusion of user defined data in the DCE registry records along with other standard registry fields. Therefore, ERA can be used to store the user SSO capability indication digit 138 and the necessary data discussed herein for performing the SSO functionality. The issue in the integration of the NE log-on data into the DCE registry relies on the correct use of the ERA feature.

Along with the ERA the Extended Privilege Attribute Certificate ("EPAC") may also be employed. As is understood by those skilled in the art, EPAC is an extension of the DCE Privilege Attribute Certificate ("PAC") in that the ERA data are included in the traditional PAC in a ticket sent from the security server 15 node to a user 12 for access request to an NE 20.

In addition to the DCE features and functions, other functions and network interactions may be used and implemented for SSO according to various contemplated versions of the invention. An example of such SSO functions is the one for network security administrator 17 initiated NE user password initialization and recovery. Software modules in the security server 15 node and in the secure terminal server 25 node that implement the security mechanisms herein described can be written by those skilled in the art.

While this invention has been described and referenced to illustrative embodiments, the description is not intended to be construed in a limiting sense. Various modifications and combinations of illustrative embodiments as well as other embodiments and inventions will become apparent to those persons skilled in the art upon reference or description. It is, therefore, intended that the pendent claims encompass any such modifications or embodiments.

I claim:

1. In a network having a security server coupled to a data traffic network, a programmed method of permitting the single sign-on of a plurality of user stations to any of a plurality of available network elements, the method comprising the steps of:

opening a user account that indicates access to a specific network element;

enabling the single sign-on capability for said user account;

setting a single sign-on capability indicator digit in said user account;

generating a log-on identifier for said specific network element;

generating a new password for said user account;

checking said new password against an organization specific password policy to ensure its integrity;

invoking a password initialization procedure to set said log-on identifier and said new password;

saving said user account in a centralized security database on said security server, said user account containing an identifier field for said specific network element and said log-on identifier, present password and new password; and setting up said specific network element with said user account.

2. The method according to claim 1 wherein said password is generated by a random password generation program.

3. The method according to claim 1 wherein said password is generated by manual entry.

4. The method according to claim 1 further including the steps of:

creating a user account for each specific network element wherein the corresponding user station is allowed access;

fetching a user account for said specific network element;

retrieving the super-user log-on identifier, present password and new password indicators from said account record;

transmitting a message to said specific network element for initial user password setup;

obtaining a new password from a user station having access to said specific network element;

updating said user account for said specific network element by replacing the value of the present password with said new password;

generating a random password; and replacing the value of the new password with said random password.

5. A secured network architecture for the single sign-on of a user to a plurality of network elements comprising:

a data network;

a security server communicably coupled to said data network;

a plurality of security applications stored on said security server;

a centralized security database defining a plurality of user access privileges, said database stored on said security server and read/write accessible by said security applications, said database including:

a plurality of user account records containing at least a single sign-on user indication digit, a user log-on identifier, present password and new password for each of said plurality of network elements to which a user has access; and a plurality of network element account records containing at least a super-user log-on identifier, present password and new password for each of said plurality of network elements;

a terminal server providing an asynchronous serial communications bridge between said security server and said plurality of network elements; and a plurality of user nodes communicably coupled to said data network, wherein some of said user nodes are connected locally to said data network via a local area network and some are connected remotely via a dial-up configuration for communicating with said plurality of network elements.

6. The secured network architecture according to claim 5 wherein said security applications include at least the following programmed modules:

a user authentication program that requests user specific identifiers and compares them against information stored in said centralized security database;

a user authorization program for determining which of said plurality of network elements an authenticated user has access to;

a data encryption standard program for encrypting and deencrypting data traffic between said plurality of user stations and said plurality of network elements;

a data integrity program for guarding the data traffic on said network;

a user privilege control program that determines the level of access of specific user stations to any of said plurality of network elements;

a user access audit program for logging all user access attempts and creating an audit trail; and a centralized administration program for managing said plurality of users on a network wide basis.

7. The secured network architecture according to claim 5 wherein said plurality of network elements and said plurality of user nodes communicate over said data network using the distributed computing environment standard.

8. The secured network architecture according to claim 5 wherein said user authentication program employs the distributed computing environment key distribution service based on Kerberos authentication algorithym.

9. The secured network architecture according to claim 5 wherein said user authorization program uses the distributed cell directory service and an access control list mechanism.

* * * * *